United States Patent
Takada et al.

(10) Patent No.: US 11,158,915 B2
(45) Date of Patent: Oct. 26, 2021

(54) BATTERY PACK

(71) Applicant: SANYO Electric Co., Ltd., Osaka (JP)

(72) Inventors: Atsushi Takada, Osaka (JP); Tsuyoshi Kaku, Hyogo (JP); Fumiya Matsushita, Hyogo (JP); Hiroki Teraoka, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 244 days.

(21) Appl. No.: 15/506,775

(22) PCT Filed: Feb. 24, 2015

(86) PCT No.: PCT/JP2015/000898
§ 371 (c)(1),
(2) Date: Feb. 27, 2017

(87) PCT Pub. No.: WO2016/051616
PCT Pub. Date: Apr. 7, 2016

(65) Prior Publication Data
US 2017/0279106 A1 Sep. 28, 2017

(30) Foreign Application Priority Data
Sep. 30, 2014 (JP) .............................. JP2014-201583

(51) Int. Cl.
*H01M 50/00* (2021.01)
*H01M 50/581* (2021.01)
(Continued)

(52) U.S. Cl.
CPC ..... *H01M 50/581* (2021.01); *H01M 10/0525* (2013.01); *H01M 10/0585* (2013.01);
(Continued)

(58) Field of Classification Search
CPC .. H01M 10/4257; H01M 2/202; H01M 2/344; H01M 2/1061; H01M 2/1066; H01M 2/348
See application file for complete search history.

(56) References Cited

U.S. PATENT DOCUMENTS

| 6,146,788 | A | * | 11/2000 | Ikeda | .................. | H01M 50/502 |
| | | | | | | 429/160 |
| 2003/0146734 | A1 | * | 8/2003 | Kozu | .................... | H01M 2/021 |
| | | | | | | 320/107 |

(Continued)

FOREIGN PATENT DOCUMENTS

| CN | 1416599 | 5/2003 |
| CN | 102742043 | 10/2012 |

(Continued)

OTHER PUBLICATIONS

International Search Report of PCT application No. PCT/JP2015/000898 dated Jun. 2, 2015.

(Continued)

*Primary Examiner* — Milton I Cano
*Assistant Examiner* — Mary G Henshaw
(74) *Attorney, Agent, or Firm* — Wenderoth, Lind & Ponack, L.L.P.

(57) ABSTRACT

In a battery pack, circuit board and thin cells are insert-molded in resin mold portion formed by a die, and are fixed to fixed positions. At least one of thin cells is disposed at a position where circuit board faces terminal surface. Terminal surfaces of thin cells and circuit board, which are interconnected, are buried in resin mold portion, thin cells are disposed on the same plane, and circuit board is integrally connected and fixed to the thin cells so as to be parallel with both surfaces of the thin cells. Thus, the thin cells are (Continued)

strongly interconnected via the resin mold portion, and all thin cells are disposed on the same plane without warpage.

9 Claims, 7 Drawing Sheets

(51) Int. Cl.
    *H01M 10/0585*     (2010.01)
    *H01M 50/209*     (2021.01)
    *H01M 10/42*     (2006.01)
    *H01M 10/0525*     (2010.01)
    *H01M 10/48*     (2006.01)

(52) U.S. Cl.
    CPC ....... *H01M 10/425* (2013.01); *H01M 10/486* (2013.01); *H01M 50/209* (2021.01); *H01M 2200/103* (2013.01); *H01M 2220/20* (2013.01); *H01M 2220/30* (2013.01)

(56) References Cited

U.S. PATENT DOCUMENTS

| 2013/0004799 | A1 | 1/2013 | Bang et al. | |
|---|---|---|---|---|
| 2014/0342212 | A1* | 11/2014 | Goesmann | H01M 2/24 |
| | | | | 429/121 |
| 2015/0147599 | A1* | 5/2015 | Lee | H01M 2/1022 |
| | | | | 429/7 |

FOREIGN PATENT DOCUMENTS

| JP | 2001-256937 | 9/2001 |
|---|---|---|
| JP | 2002-260621 | 9/2002 |
| JP | 2011-096434 | 5/2011 |
| JP | 2013-518387 | 5/2013 |

OTHER PUBLICATIONS

English Translation of Chinese Search Report dated Mar. 1, 2019 in Chinese Patent Application No. 201580050583.1.

* cited by examiner

BATTERY PACK

TECHNICAL FIELD

The present invention relates to a battery pack produced by disposing a plurality of thin cells on the same plane and integrally interconnecting them.

BACKGROUND ART

In a battery pack, the output voltage can be increased by interconnecting a plurality of cells in series, or the output current and battery capacity can be increased by interconnecting the plurality of cells in parallel. In a battery pack, a plurality of thin cells are interconnected in series or in parallel to provide a voltage, current, and battery capacity optimum for a used electric appliance. Recently, a portable device such as a smartphone or a tablet, which is a frequently used application, requires a thin battery pack having a high voltage, a high current, and a large battery capacity. In a battery pack used for such an application, in order to thin the whole battery pack, a plurality of thin cells must be disposed on the same plane and interconnected in series or in parallel. In a battery pack for this application, a plurality of thin cells are stored in a frame and fixed via a label. In a battery pack having this structure, the thin cells are fixed in the frame via the label, so that it is disadvantageously difficult that many thin cells are firmly fixed to fixed positions. Especially in this battery pack, the thin cells are fixed in the frame via the label, so that it is disadvantageously difficult that many thin cells are firmly fixed to the fixed positions in the frame.

Furthermore, in the above-mentioned battery pack, a battery assembly is produced by connecting the thin cells to a circuit board so that the thin cells can be disposed inside the frame. This battery assembly is disposed inside the frame and is fixed via the label. Therefore, disadvantageously, much time and effort is taken for producing the battery assembly, disposing the battery assembly inside the frame, and fixing them via the label. The manufacturing cost therefore becomes high. Furthermore, the battery pack in which many thin cells are disposed on the same plane is apt to become warped because it is difficult to accurately interconnect all thin cells on the same plane.

A battery pack is developed in which thin cells are fixed to a resin mold portion in which a circuit board or the like insert-molded (Patent Literature 1 and Patent Literature 2). This battery pack is produced in the following processes: thin cells and a circuit board are temporarily fixed to a molding chamber of a die; molten resin is injected into the molding chamber; then the molten resin is cooled and cured in the molding chamber to form a resin mold portion; the formed resin mold portion is taken out of the die; and the circuit board is insert-molded in the resin mold portion to fix the thin cells to fixed positions.

CITATION LIST

Patent Literature

PTL 1: Unexamined Japanese Patent Publication No. 2002-260621

PTL 2: Unexamined Japanese Patent Publication No. 2011-96434

SUMMARY OF THE INVENTION

A method of interconnecting a plurality of thin cells via a resin mold portion and arranging the plurality of thin cells in a planar shape is considered as possible. However, in a battery pack including a plurality of thin cells interconnected only via a resin mold portion, the plurality of thin cells are difficult to be strongly interconnected via the resin mold portion. Disadvantageously, a thin and large battery pack formed by interconnecting many thin cells cannot be commercialized.

The present invention is developed for addressing this disadvantage. An important objective of the present invention is to provide the following battery pack: a plurality of thin cells can be strongly interconnected via the resin mold portion; and all thin cells can be disposed and interconnected on the same plane without warpage.

A battery pack of the present invention includes: a plurality of thin cells; a circuit board electrically connected to the thin cells; and a resin mold portion in which the circuit board is buried. At least one of the thin cells is disposed at a position where its terminal surface faces the circuit board. In the resin mold portion, the terminal surfaces of thin cells and the circuit board are buried, the thin cells are disposed on the same plane, and the circuit board is integrally connected and fixed to the thin cells so as to be parallel with both surfaces of the thin cells.

In the present description, the state in which a circuit board is parallel with both surfaces of a thin cell means not only the state in which a circuit board is completely parallel with both surfaces of the thin cell, but also the state in which the angle formed between the circuit board and both surfaces of the thin cell is 30° or less and the circuit board is substantially parallel with the surfaces.

In the battery pack of the present invention, each thin cell can include an anchor portion buried in the resin mold portion.

In the battery pack of the present invention, as the anchor portion, a lead plate fixed to the electrode terminal of the thin cell can be employed.

In the battery pack of the present invention, a pair of wrap portions extending to the opposite surfaces of each thin cell are integrally molded on the resin mold portion, the thin cell is disposed between the pair of wrap portions, and the thin cell can be fixed to the resin mold portion by insert molding.

In the battery pack of the present invention, thickness (d) of the wrap portion can be set at 0.1 mm or more and 0.5 mm or less, and width (w) thereof can be set at 1 mm or more and 5 mm or less.

In the battery pack of the present invention, both surfaces of the resin mold portion and both surfaces of the thin cell can be disposed on the same planes.

In the battery pack of the present invention, the thin cells are disposed on both sides of the circuit board, the circuit board disposed between the thin cells is buried in the resin mold portion, and the resin mold portion in which the circuit board is buried can fix the thin cells disposed on the same plane to the opposite sides of the circuit board.

In the battery pack of the present invention, the thin cells are disposed on one side of the circuit board and arranged side by side in the longitudinal direction of the circuit board. The resin mold portion in which the circuit board is buried can fix the thin cells disposed on the same plane to one side of the circuit board.

The battery pack of the present invention includes: a plurality of lead lines each having one end connected to the circuit board and the other end drawn out of the resin mold portion; and a lead line holder for holding the lead lines at fixed positions. The lead line holder can be fixed to the resin mold portion by insert molding. The lead line holder can be fixed to the resin mold portion by insert molding in the state where the lead surface of the lead line holder is exposed on the surface of the resin mold portion. Here, the lead lines are drawn to the outside through the lead surface of the lead line holder.

The battery pack of the present invention includes a plurality of lead lines each having one end connected to the circuit board and the other end drawn out of the resin mold portion. The resin mold portion can include the following portions:

a first resin mold portion for fixing the lead lines to fixed positions in the circuit board by insert molding; and a second resin mold portion that disposes, at a fixed position by insert molding, the circuit board on which the lead lines are fixed to the fixed positions by the first resin mold portion, and disposes the thin cells on the same plane and connects them to the fixed positions.

In the battery pack of the present invention, an electronic component is fixed to the circuit board, and the circuit board having the fixed electronic component can be disposed at the fixed position in the first resin mold portion by insert molding.

In the battery pack of the present invention, a safety component or a temperature sensor disposed between the adjacent thin cells is fixed to the circuit board, the temperature sensor is buried in the resin mold portion, and the temperatures of the plurality of the thin cells can be detected solely by the safety component or temperature sensor.

In the battery pack of the present invention, the safety component or temperature sensor is fixed to the circuit board, the safety component or temperature sensor is buried in the resin mold portion, and resin grooves 51 and 52 are disposed around the safety component or temperature sensor.

In the battery pack of the present invention, the circuit board includes: a heat sensitive element for measuring the temperature of the battery pack; a current fuse for blocking the current coming from the thin cells; and a control unit for blowing the current fuse when the heat sensitive element has measured an abnormal temperature. A wire that connects the control unit to the heat sensitive element includes a connection point at which the heat sensitive element is short-circuited.

In the battery pack of the present invention, a plurality of thin cells can be strongly interconnected via a resin mold portion, and all thin cells can be disposed and interconnected on the same plane without warpage. That is because the battery pack of the present invention has the following structure:

at least one of the thin cells is disposed at a position where its terminal surface faces a circuit board;

the circuit board is buried, as the center of the frame, in the resin mold portion in parallel with the thin cells; and the terminal surface of the thin cell is connected to the circuit board strongly without coming off.

Furthermore, in the battery pack of the present invention, a thin cell can include an anchor portion. In the battery pack, by burying the anchor portion in the resin mold portion, the thin cell can be connected to the resin mold portion strongly without coming off. Furthermore, the circuit board is buried in the resin mold portion in the state where the circuit board extends in an arrangement direction of the interconnected thin cells, and the circuit board reinforces the resin mold portion.

In the battery pack of the present invention, a plurality of thin cells are temporarily fixed to the fixed positions of a die, the thin cells are disposed on the same plane, molten resin is injected into the molding chamber of the die in this state, a resin mold portion is formed, and the circuit board and thin cells are fixed to the resin mold portion by insert molding. Therefore, the thin cells are accurately disposed on the same plane. The thin cells are kept in an arrangement state on the same plane and the resin mold portion is formed, so that the circuit board is buried in the resin mold portion to reinforce the resin mold portion. The thin cells are connected to the fixed positions via the resin mold portion that is connected to the thin cells without coming off, so that the whole battery pack can be produced without warpage by interconnecting many thin cells.

Furthermore, a plurality of thin cells are disposed on the same plane, use of a frame is not required differently from a conventional battery pack, and the component cost can be reduced by omitting the frame. In a process of forming a resin mold portion, all electronic components other than the thin cells are mounted on a circuit board, and all parts including the circuit board and the thin cells can be fixed to the fixed positions. Therefore, the assembling procedure is simplified, and the manufacturing cost can be reduced.

DESCRIPTION OF EMBODIMENT(S)

Hereinafter, examples of the present invention are described with reference to the accompanying drawings. The following examples show battery packs for embodying the technical ideas of the present invention. The present invention is not limited to the following battery packs. In this description, members shown in the scope of claims are not limited to the members of the examples.

Figure 1:
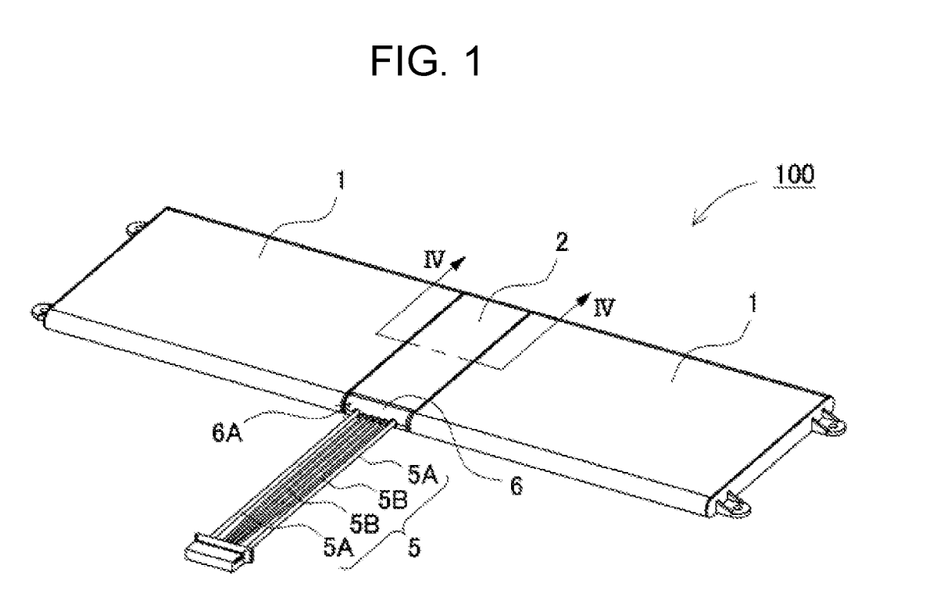
FIG. 1 is a perspective view of a battery pack in accordance with one example of the present invention.
Figure 3:
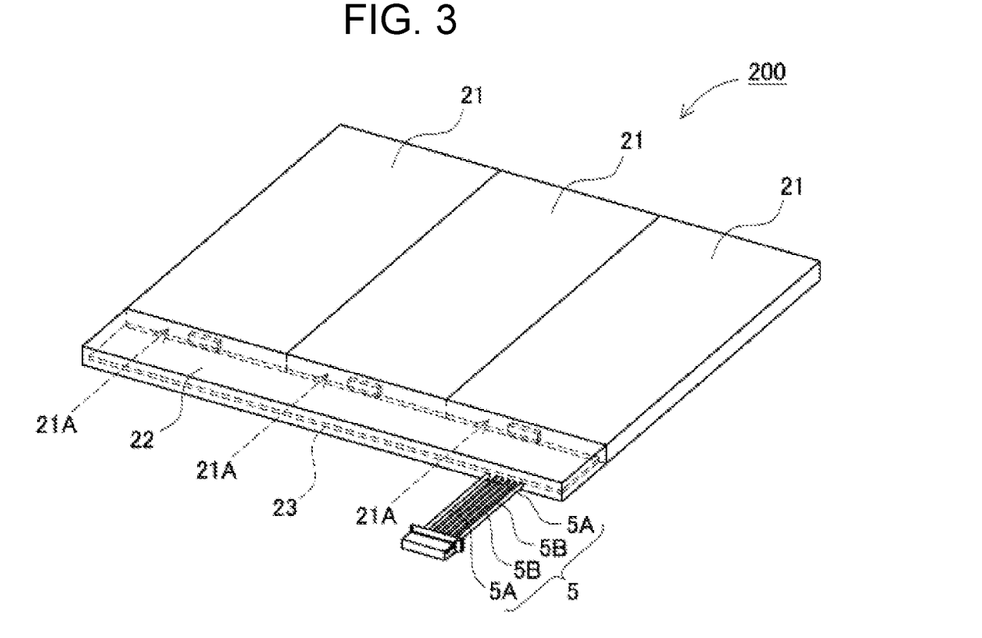
FIG. 3 is a perspective view of a battery pack in accordance with another example of the present invention.

Battery pack 100 or 200 shown in FIG. 1 or FIG. 3 includes: a plurality of thin cells 1 or 21; circuit board 3 or 23 electrically connected to thin cells 1 or 21; and resin mold portion 2 or 22 formed by a die in which circuit board 3 or 23 is buried. In battery pack 100 or 200 shown in these drawings, a plurality of terminal surfaces 1A or 21A of the plurality of thin cells 1 are disposed at the positions facing circuit board 3 or 23, and the plurality of thin cells 1 or 21 disposed on the same plane are interconnected via resin mold portion 2 or 22 in which circuit board 3 or 23 is buried.

Thin cell 1 is a rectangular cell in which an opening of metal exterior can 11 is air-tightly sealed by sealing plate 12. However, as thin cell 1, not only a rectangular cell, but also a laminated cell including electrodes inside a plastic exterior film can be used. Thin cell 1 is a lithium-ion cell of a thickness of 3 mm to 10 mm Here, thin cell 1 may be any other chargeable secondary cell such as a nickel-metal-hydride cell. In the rectangular cell shown in the drawings, both side surfaces of exterior can 11 are bent. Battery pack 100 including lithium-ion cells as thin cells 1 can increase the whole battery capacity. Thin cell 1 includes a safety valve (not shown) in sealing plate 12 on terminal surface 1A having electrode terminal 13. When the internal pressure is higher than a set pressure, the safety valve opens to exhaust internal gas or the like, and prevents the increase in internal pressure. The safety valve of thin cell 1 may be disposed in exterior can 11. In that case, in battery pack 100 or 200 including sealing plate 12 buried in resin mold portion 2 or 22, internal gas or the like can be easily exhausted through a side surface of exterior can 11.

Figure 4:
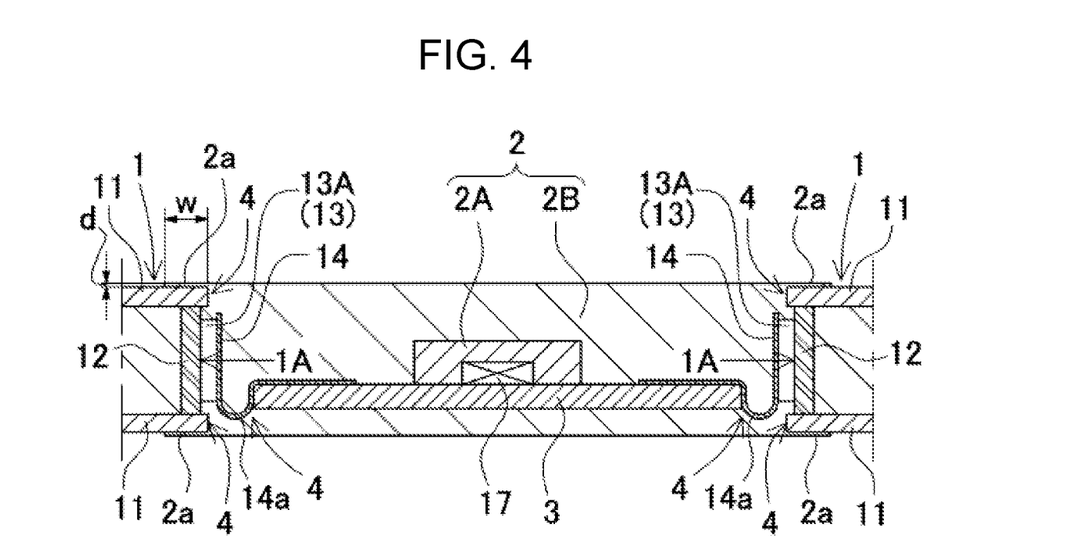
FIG. 4 is a sectional view taken along line IV-IV on the battery pack of FIG. 1.

Thin cell 1 includes anchor portion 4 on terminal surface 1A buried in resin mold portion 2. In thin cell 1 shown in the exploded perspective view of FIG. 2 and in the sectional view of FIG. 4, an opening edge of exterior can 11 is projected from the surface of sealing plate 12, and a loop-like rib is disposed on the outer periphery of sealing plate 12 to form anchor portion 4. The opening edge of exterior can 11 is buried as anchor portion 4 in resin mold portion 2, and thus thin cell 1 is strongly connected to resin mold portion 2. In thin cell 1 shown in FIG. 4, lead plate 14 welded to projecting electrode 13A as electrode terminal 13 is buried as anchor portion 4 in resin mold portion 2. Lead plate 14 is folded in an L shape, one end thereof is fixed to projecting electrode 13A of thin cell 1, and the other end thereof is fixed to circuit board 3. A part of L-shaped lead plate 14 that projects from projecting electrode 13A toward circuit board 3 is buried in resin mold portion 2, and L-shaped lead plate 14 is connected to resin mold portion 2 without coming off. Lead plate 14 shown in the sectional view of FIG. 4 includes projection 14a projecting from the outer periphery of projecting electrode 13A, and projection 14a is buried in resin mold portion 2 and is more strongly connected to resin mold portion 2. In FIG. 4, projection 14a is formed under projecting electrode 13A by extending lead plate 14. However, the following structure may be employed: the width of lead plate 14 is made greater than that of projecting electrode 13A, such a projection is formed on a lateral side of projecting electrode 13A, and this projection is buried in resin mold portion 2.

Anchor portion 4 not only includes the opening edge of exterior can 11 of thin cell 1 and lead plate 14, but also may include, on terminal surface 1A of thin cell 1, anchor plate 15 electrically insulated from circuit board 3. In this case, in a place having no lead plate 14, thin cell 1 can be more strongly connected to resin mold portion 2. The insulation of anchor plate 15 is achieved by interposing resin mold portion 2 between it and circuit board 3, or by employing an insulating material such as a plastic plate pasted on sealing plate 12 via double-sided tape. Especially, in the case that anchor plate 15 is made of an insulating material such as a plastic plate, the connecting strength between thin cell 1 and circuit board 3 can be increased by fixing one end of anchor plate 15 to sealing plate 12 and fixing the other end to circuit board 3. Furthermore, thin cell 1 can be more strongly connected to resin mold portion 2 by burying anchor plate 15 fixed to circuit board 3 in resin mold portion 2.

An electronic component for achieving a protection circuit of thin cell 1 is mounted on circuit board 3 connected to lead plate 14. The protection circuit detects the temperature and voltage of thin cell 1, and controls charge/discharge current. In order to achieve this operation, circuit board 3 includes: a voltage detection circuit (not shown) for detecting the voltage of thin cell 1; safety component 16 for protecting thin cell 1, such as a breaker, a positive temperature coefficient (PTC) element, or a fuse; temperature sensor 17 for detecting the temperatures of thin cells 1; and a semiconductor switching element (not shown) such as a field effect transistor (FET) that is one type of safety component 16 and controls the current of thin cell 1. Safety component 16 detects the temperatures of all thin cells 1, and blocks the current when the temperature of any thin cell 1 is higher than a set temperature. Temperature sensor 17 detects the temperatures of all thin cells 1, and, when the temperature of any thin cell 1 becomes higher than a set temperature, turns off the switching element to block the current.

Figure 2:
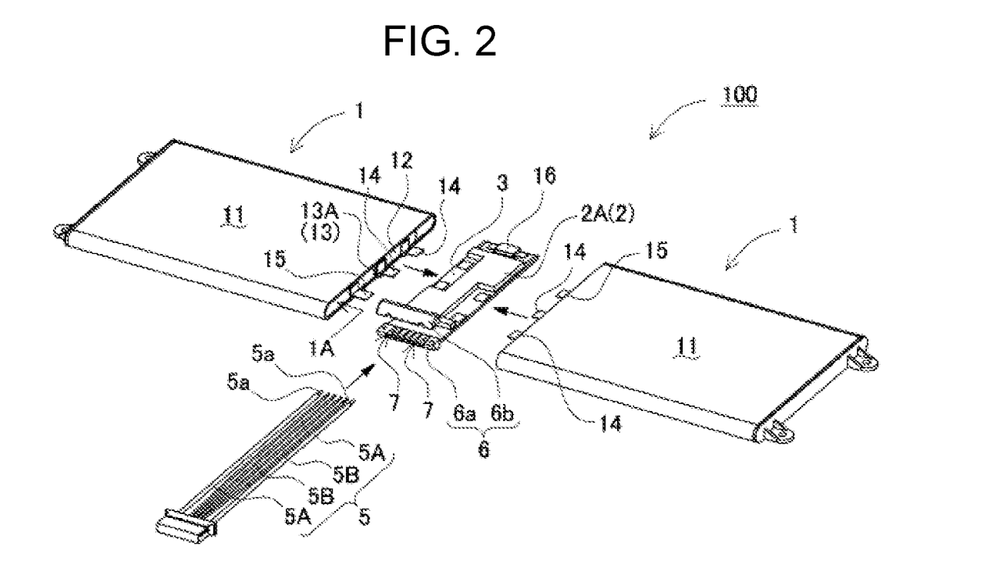
FIG. 2 is an exploded perspective view of the battery pack shown in FIG. 1.

Battery pack 100 of FIG. 2 includes safety component 16 at an end of circuit board 3 having thin cells 1 on the opposite sides, and safety component 16 solely detects the temperatures of thin cells 1 on the opposite sides. Safety component 16 is buried in resin mold portion 2, and is thermally coupled to both thin cells 1 via resin mold portion 2. Battery pack 100 shown in the sectional view of FIG. 4 includes temperature sensor 17 in a center part on circuit board 3 that has thin cells 1 on the opposite sides, and temperature sensor 17 solely detects the temperatures of thin cells 1 on the opposite sides. Temperature sensor 17 is buried in resin mold portion 2, and is thermally coupled to both thin cells 1 via resin mold portion 2. Battery pack 100 can detect the temperatures of thin cells 1 on the opposite sides with one safety component 16 or one temperature sensor 17, so that the number of safety components 16 or temperature sensors 17 can be reduced. Since safety component 16 or temperature sensor 17 is mounted on circuit board 3, so that safety component 16 or temperature sensor 17 does not need to be connected to thin cells 1 via leads, and the assembling process can be simplified.

In battery pack 100 shown in the sectional view of FIG. 4, circuit board 3 is buried in resin mold portion 2, so that a semiconductor switching element such as an FET is also buried in resin mold portion 2. In this structure, the heat generated by the semiconductor switching element can be transferred to resin mold portion 2 and can be radiated. Therefore, resin mold portion 2 absorbs the heat generated by the semiconductor switching element to reduce the temperature increase, and radiates the absorbed heat energy from its surface to reduce the temperature increase of the semiconductor switching element. In battery pack 100 of FIG. 4, circuit board 3 and terminal surfaces 1A of thin cells 1 are buried in resin mold portion 2, so that circuit board 3 and terminal surfaces 1A of thin cells 1 can be protected from water.

Circuit board 3 or 23 is made of epoxy resin reinforced by glass fiber, and has a more sufficient strength than that of resin mold portion 2 or 22. Circuit board 3 or 23 is buried in resin mold portion 2 or 22, and reinforces resin mold portion 2 or 22. Especially, circuit board 3 or 23 is buried in resin mold portion 2 or 22 in the state where circuit board 3 or 23 extends in the arrangement direction of thin cells 1 or 21, and reinforces the bending strength of resin mold portion 2 or 22. Circuit board 3 or 23 buried in resin mold portion 2 or 22 in the state where the circuit board extends in the arrangement direction of thin cells 1 or 21 is, ideally, disposed in parallel with both surfaces of thin cells 1 or 21 as shown in FIG. 4 and FIG. 3. Circuit board 3 or 23 can be buried not only in parallel with both surfaces of thin cells 1 or 21, but also in a state inclined with respect to both surfaces of thin cells 1 or 21—for example, in the inclined state by an angle of 30° or less. In other words, the circuit board and both surfaces of the thin cells can be disposed not only in the complete parallel state but also in a substantially parallel state where the inclined angle of the circuit board with respect to both surfaces of the thin cells is 30° or less. Thin cells 1 or 21 are disposed on the same plane, and integrally connected to resin mold portion 2 or 22 reinforced by circuit board 3 or 23. In battery pack 100 or 200, the plurality of thin cells 1 or 21 are integrally interconnected via resin mold portion 2 or 22, so that the strength, especially the bending strength, of resin mold portion 2 or 22 is important.

Resin mold portion 2 or 22 is formed by temporarily fixing circuit board 3 or 23 and thin cells 1 or 21 to the fixed positions of a die and injecting molten resin into a molding chamber of the die. Circuit board 3 or 23 is buried in resin mold portion 2 or 22, and circuit board 3 or 23 and thin cells 1 or 21 are interconnected and fixed to the fixed positions by insert molding. Resin mold portion 2 or 22 is formed by injecting, into the molding chamber of the die, the thermoplastic resin that has been heated into a molten state. As the thermoplastic resin for resin mold portion 2 or 22, a resin that can be heated at a low temperature and be injected and molded into a molding chamber at a low pressure is used. For example, the resin includes a polyamide resin, or a polyolefin-based or urethane-based thermoplastic resin. The resin injected into the molding chamber at a low temperature and a low pressure prevents heat from adversely affecting thin cells 1 or 21 and the mounted components on circuit board 3 or 23. The polyolefin-based resin has a mechanical strength higher than that of the polyamide resin, and hence can more strongly interconnect thin cells 1 or 21. The operating temperature range of the polyamide resin is −40° C. to 150° C., namely larger than that of the polyolefin-based resin, so that the polyamide resin can strongly interconnect thin cells 1 or 21 even when the temperatures of thin cells 1 or 21 become high during use. In the molten resin injected into the molding chamber of the die, circuit board 3 or 23 is buried and terminal surfaces 1A or 21A of thin cells 1 or 21 are buried, and they are fixed at the fixed positions by insert molding.

Resin mold portion 2 of FIG. 4 integrally includes wrap portions 2a extending on the opposite surfaces of each thin cell 1. Wrap portions 2a are made to tightly adhere to the opposite surfaces of thin cell 1, and strongly connect resin mold portion 2 to thin cell 1. Wrap portions 2a are disposed near terminal surfaces 1A of thin cell 1, and are connected to resin mold portion 2. In order to reduce the projection amount of wrap portions 2a from the surface of each thin cell 1 and strongly connect each thin cell 1 to resin mold portion 2, for example, thickness (d) of each wrap portion 2a is set at 0.1 mm or more and 0.5 mm or less, and width (w) thereof is set at 1 mm or more and 5 mm or less. In battery pack 100, each thin cell 1 is disposed between a pair of wrap portions 2a, wrap portions 2a are made to tightly adhere to thin cell 1, and thin cell 1 is fixed to resin mold portion 2 by insert molding. In other words, the pair of wrap portions 2a tightly adhering to the opposite surfaces of thin cell 1 are connected to resin mold portion 2 in the state where wrap portions 2a hold thin cell 1 from the opposite surfaces.

In battery pack 100 of FIG. 4, resin mold portion 2 and both surfaces of thin cells 1 are disposed on the same plane. Wrap portions 2a slightly project from the surfaces of thin cells 1, but a center part of each thin cell 1 swells to one side by about 5% of the thickness of thin cell 1 due to the repetition of charge and discharge. Therefore, thickness (d) of each wrap portion 2a is set at 0.5 mm (=10 mm×5%) or less as described above so that the thickness is absorbed by the swelling of thin cell 1. Furthermore, thin cell 1 does not swell in the range from sealing plate 12 to about 5 mm from it, so that width (w) of each wrap portion 2a is set at 5 mm or less as described above so that wrap portion 2a is disposed in a region where thin cell 1 does not swell. Thin cell 1 is strongly connected to resin mold portion 2 via wrap portion 2a, and simultaneously the thickness of battery pack 100 does not substantially increase.

In battery pack 100 of FIG. 1, FIG. 2, and FIG. 4, thin cells 1 are disposed on the opposite sides of circuit board 3, circuit board 3 disposed between thin cells 1 is buried in resin mold portion 2, and thin cells 1 disposed on the same plane are interconnected via resin mold portion 2. Since thin cells 1 are connected to the opposite sides of circuit board 3 in battery pack 100, the whole length is two times the length of one thin cell 1. However, battery pack 100 has a great strength because resin mold portion 2 for interconnecting thin cells 1 on the opposite sides has a sufficient bending strength. Battery pack 200 of FIG. 3 has the following structure: the shape of circuit board 23 is an elongated rectangle; a plurality of thin cells 21 are arranged side by side in the longitudinal direction along one side of circuit board 23; and thin cells 21 disposed on the same plane are interconnected via resin mold portion 22 in which circuit board 23 is buried. Since the plurality of thin cells 21 are arranged in the longitudinal direction of circuit board 23 in battery pack 200, battery pack 200 extends in the longitudinal direction. However, the whole battery pack can be made strong by resin mold portion 22 because buried circuit board 23 increases the bending strength of resin mold portion 22.

Although not shown, thin cells 1 or 21 are coated with an exterior film in battery pack 100 or 200. In battery pack 100 of FIG. 1, each thin cell 1 is coated with an exterior film. In battery pack 200 of FIG. 3, the plurality of laterally arranged thin cells 21 are integrally coated with an exterior film, and are interconnected. The exterior film also covers the boundaries between thin cells 1 or 21 and resin mold portion 2 or 22, so that the exterior film can increase the connecting strength between thin cells 1 or 21 and resin mold portion 2 or 22.

A plurality of lead lines 5 are connected to circuit board 3 or 23, and are drawn to the outside. Lead lines 5 include positive and negative power lines 5A and signal lines 5B, and are directly connected to a connector of a device in which battery pack 100 or 200 is installed. The battery pack having the lead lines does not require the structure in which a connector is disposed in the battery pack and the lead lines are connected to the connector. Therefore, it is not necessary that the battery pack is connected to the lead lines via the connector, and an adverse effect such as a contact failure of the connector can be prevented. However, in a battery pack in which the plurality of lead lines are connected to the circuit board and are drawn to the outside from the resin mold portion, the resin mold portion for insert-molding the circuit board is difficult to be formed, and the probability that defective products are generated in this process becomes high. That is because, when the circuit board is temporarily fixed and the die is closed, the lead lines are grasped by the die and are damaged.

Figure 5:
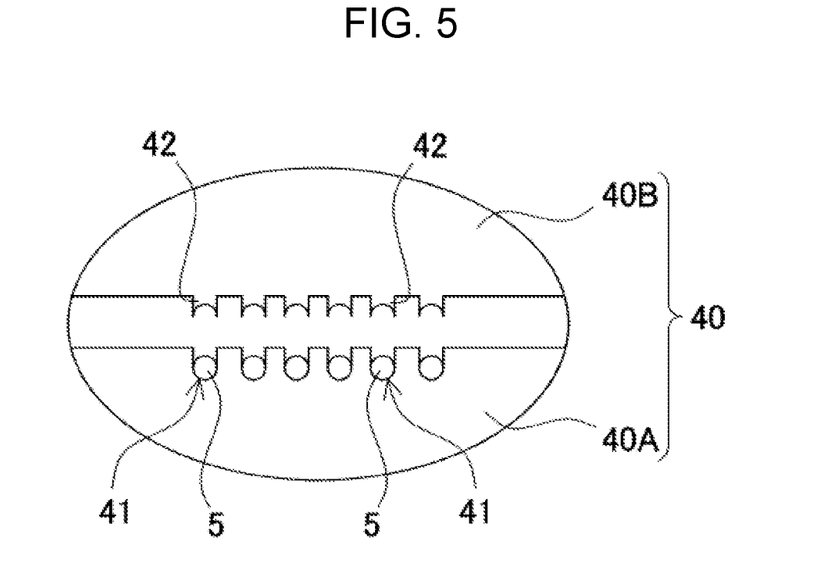
FIG. 5 is an exploded front view showing the state in which a die grasps and clamps lead lines in a manufacturing process of a conventional battery pack.

FIG. 5 is a front view showing the state in which die 40 grasps and clamps lead lines 5 in a manufacturing process of a conventional battery pack. In order to prevent injected molten resin from leaking, die 40 must seal a molding chamber while lead lines 5 are grasped with upper and lower dies 40. Lead lines 5 connected to the circuit board are drawn to the outside of the molding chamber in the state in which they are temporarily fixed to die 40, so that die 40 and lead lines 5 must be clamped so that a gap does not occur between them. In order to achieve the clamping, lower die 40A of die 40 of FIG. 5 includes a plurality of columns of guide grooves 41 for guiding lead lines 5. The bottom of each guide groove 41 has a semicircular shape following each lead line 5. Upper die 40B includes a plurality of columns of ridges 42 to be inserted into guide grooves 41, and the tip surface of each ridge 42 has a semicircular shape. In die 40, lead lines 5 are put into guide grooves 41 and disposed at fixed positions, ridges 42 are inserted into guide grooves 41, the upper and lower sides of lead lines 5 are grasped by upper die 40B and lower die 40A, and die 40 is made to tightly adhere to the surfaces of lead lines 5.

In die 40 of FIG. 5, lead lines 5 are guided to guide grooves 41 of lower die 40A having a comb-shaped upper surface, upper die 40B is made to tightly adhere to lower die 40A, lead lines 5 are drawn from the molding chamber without a gap. However, in the clamping state, lead lines 5 can be grasped and damaged between upper die 40B and lower die 40A. When a resin mold portion is formed while lead lines 5 are grasped by die 40, the molten resin leaks through the gap between lead lines 5 and die 40, or lead lines 5 grasped by die 40 are damaged. As a result, the battery pack becomes defective. When defective products are generated in this process, all components including the thin cells become unusable, and hence the economic loss extremely increases.

Figure 6:
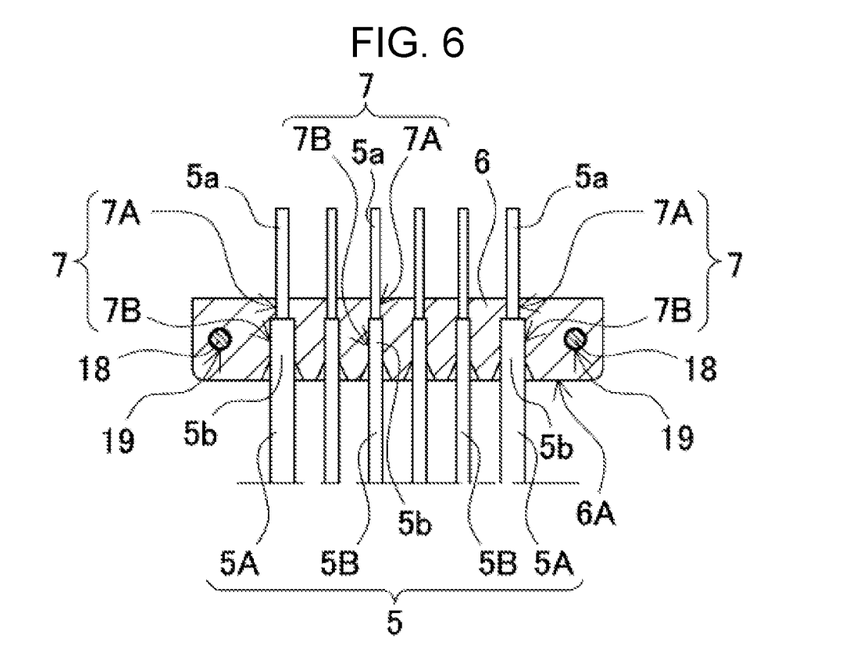
FIG. 6 is a horizontal sectional view of a lead line holder of the battery pack of FIG. 1.

In order to prevent the above mentioned adverse effects, battery pack 100 of FIG. 1 and FIG. 2 includes lead line holder 6 for holding lead lines 5 at the fixed positions. Lead line holder 6 has an engagement structure, for example, and is connected and fixed to a fixed position of circuit board 3. Lead line holder 6 includes insertion holes 7. Lead lines 5 are separately and individually inserted into insertion holes 7, and are disposed at the fixed positions. As shown in the sectional view of FIG. 6, each insertion hole 7 includes core wire hole 7A into which core wire 5a of each lead line 5 is inserted, and guide hole 7B into which outer coat 5b of each lead line 5 is inserted without a gap. The inner diameter of core wire hole 7A is set smaller than that of guide hole 7B so that core wire 5a can be inserted into core wire hole 7A but outer coat 5b cannot be inserted into it. The inner diameter of guide hole 7B is set substantially equal to the outer diameter of lead line 5 so that outer coat 5b of lead line 5 can be inserted into guide hole 7B and can tightly adhere to it. The opening of guide hole 7B of FIG. 6 is enlarged in a tapered shape so that lead line 5 can be smoothly inserted into guide hole 7B.

Lead line holder 6 of FIG. 2 is vertically divided into two parts: first holder 6a, and second holder 6b. Lead line holder 6 is divided into two parts so that a plurality of adjacent insertion holes 7 are cut axially. As shown in the sectional view of FIG. 6, first holder 6a and second holder 6b include, on their surfaces facing each other, grooves defining core wire holes 7A and grooves defining guide holes 7B. Thus, by connecting first holder 6a to second holder 6b, core wire holes 7A and guide holes 7B are formed. Lead line holder 6 is formed by positioning and engaging first holder 6a and second holder 6b with each other. In first holder 6a and second holder 6b, one of the surfaces facing each other includes engagement projections 18, and the other includes engagement recesses 19 into which engagement projections 18 are fitted. First holder 6a and second holder 6b can be interconnected at accurate positions by fitting engagement projections 18 into engagement recesses 19. In lead line holder 6, for example, core wires 5a and outer coats 5b of lead lines 5 can be easily and accurately disposed in insertion holes 7, by connecting second holder 6b to first holder 6a in the following states:

core wires 5a of lead lines 5 are guided to the grooves defining core wire holes 7A in first holder 6a; and outer coats 5b of lead lines 5 are guided to the grooves defining guide holes 7B.

First holder 6a and second holder 6b can be fixed by adhesion, or can be interconnected without coming off by press-fitting engagement projections 18 into engagement recesses 19.

The battery pack in which lead line holder 6 is connected to circuit board 3 is assembled through the following processes.

1. First holder 6a of lead line holder 6 is connected to circuit board 3, and lead lines 5 are guided to insertion holes 7 in first holder 6a. Then, second holder 6b is connected to first holder 6a, and lead lines 5 are disposed at fixed positions of circuit board 3. However, lead line holder 6 may be connected to the fixed positions of circuit board 3 by guiding lead lines 5 into insertion holes 7 in first holder 6a, connecting second holder 6b to first holder 6a, and disposing lead lines 5 at the fixed positions. In this state, core wires 5a of lead lines 5 are soldered to circuit board 3. Furthermore, circuit board 3 is connected to thin cells 1 via lead plates 14.

Figure 7:
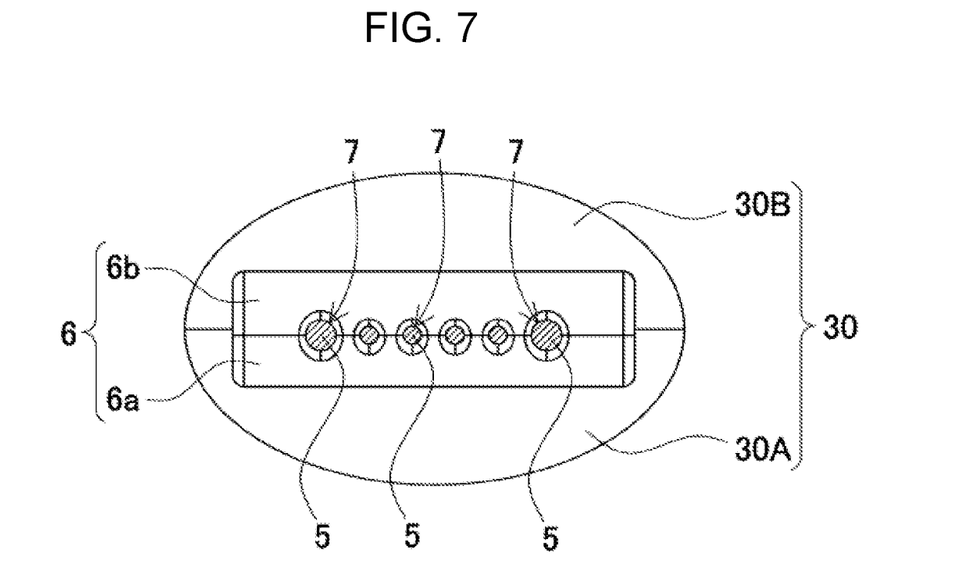
FIG. 7 is an exploded front view showing the state in which a die grasps and clamps a lead line holder in a manufacturing process of the battery pack of FIG. 1.

2. Thin cells 1, circuit board 3, and lead line holder 6 are temporarily fixed to fixed positions of die 30, and a molding chamber is clamped. In this state, as shown in FIG. 7, upper die 30B and lower die 30A grasp lead line holder 6 without grasping lead lines 5, and the openings in the molding chamber through which lead lines 5 are drawn to the outside are air-tightly sealed. Since die 30 clamps the molding chamber while grasping lead line holder 6 without grasping lead lines 5, die 30 does not grasp or damage lead lines 5 and lead line holder 6 can certainly clamp the molding chamber in a sealed state. Since die 30 does not seal the molding chamber while grasping lead lines 5, but seals the molding chamber while grasping lead line holder 6, lead surface 6A of lead line holder 6 through which lead lines 5 are drawn to the outside is exposed to the outside. Therefore, in the process of forming resin mold portion 2, lead surface 6A of lead line holder 6 is exposed to the outside.

3. After molten resin is cured, upper and lower dies 30 are opened and the battery pack is taken out. In this state, thin cells 1 are connected to fixed positions via resin mold portion 2, circuit board 3 is insert-molded in resin mold portion 2, and lead lines 5 are drawn out of lead line holder 6.

In the process of forming resin mold portion 2 or 22, circuit board 3 or 23 and thin cells 1 or 21 are disposed at fixed positions. The plurality of thin cells 1 or 21 are positioned and disposed on the same plane. In resin mold portion 2 or 22, circuit board 3 or 23 and thin cells 1 or 21 that have been temporarily fixed to a die are insert-molded, and are disposed and fixed at fixed positions. Especially, in battery pack 100 or 200 of the present invention, the plurality of thin cells 1 or 21 are temporarily fixed on the same plane by the die, resin mold portion 2 or 22 is formed, and thin cells 1 or 21 are strongly interconnected via resin mold portion 2 or 22, so that thin cells 1 or 21 are disposed and fixed on the same plane without warpage.

As shown in FIG. 1, FIG. 2, and FIG. 4, battery pack 100 in which resin mold portion 2 is formed through two processes of forming first resin mold portion 2A and second resin mold portion 2B also can reduce the adverse effect produced by a failure of lead lines 5. In battery pack 100, resin mold portion 2 includes first resin mold portion 2A and second resin mold portion 2B. In first resin mold portion 2A, lead lines 5 are fixed to fixed positions of circuit board 3 by insert molding. In second resin mold portion 2B, circuit board 3 in which lead lines 5 are disposed to the fixed positions via first resin mold portion 2A is disposed to a fixed position by insert molding, and thin cells 1 are disposed on the same plane and connected to fixed positions. In battery pack 100, lead lines 5 are connected to the fixed positions of circuit board 3 in first resin mold portion 2A, and circuit board 3 in which lead lines 5 are connected to the fixed positions is disposed at the fixed position by insert molding in second resin mold portion 2B. In the process of forming second resin mold portion 2B, first resin mold portion 2A exposes lead surface 6A of lead lines 5 on the surface of second resin mold portion 2B so that the die does not grasp lead lines 5.

In battery pack 100, a die for forming second resin mold portion 2B grasps first resin mold portion 2A and air-tightly seals the molding chamber that forms second resin mold portion 2B. In the process of forming first resin mold portion 2A, the upper and lower dies grasp lead lines 5 and air-tightly seal the molding chamber that forms first resin mold portion 2A. Therefore, in this process, defective products can be generated by grasping of lead lines 5 by the die. In the process of forming first resin mold portion 2A, however, thin cells 1 are not connected to it. Therefore, the defective products generated in this process do not include thin cells 1, and hence the loss due to the generation of the defective products is extremely small. The die for forming second resin mold portion 2B air-tightly seals the molding chamber while grasping first resin mold portion 2A without grasping lead lines 5. Therefore, the process of forming second resin mold portion 2B does not cause an accident in which the die grasps lead lines 5 to generate defective products.

In battery pack 100, thin cells 1 are temporarily fixed to the fixed positions of the die for forming second resin mold portion 2B, and second resin mold portion 2B is formed. Therefore, second resin mold portion 2B is formed, circuit board 3 in which lead lines 5 are disposed at the fixed positions via first resin mold portion 2A is buried in it, and thin cells 1 can be connected to the fixed positions. An electronic component fixed to circuit board 3 is buried in first resin mold portion 2A, and is fixed to the fixed position by insert molding.

Resin mold portion 2 is formed, by temporarily fixing circuit board 3 and thin cells 1 to the fixed positions of the die and injecting molten resin into the molding chamber of the die. As the molten resin, a resin that can be heated to a low temperature, can be injected into the molding chamber at a low pressure, and can be molded is employed. For example, a polyamide resin or a polyolefin-based or urethane-based thermoplastic resin is employed. The resin that is injected into the molding chamber at a low temperature and a low pressure does not exert an adverse effect produced by heat on thin cells 1 or the components mounted on circuit board 3. The polyolefin-based resin has a mechanical strength higher than that of the polyamide resin, and hence can more strongly interconnect thin cells 1. In the molten resin injected into the molding chamber of the die, circuit board 3 is buried and terminal surfaces 1A of thin cells 1 are buried, and they are fixed to fixed positions by insert molding.

Figure 8:
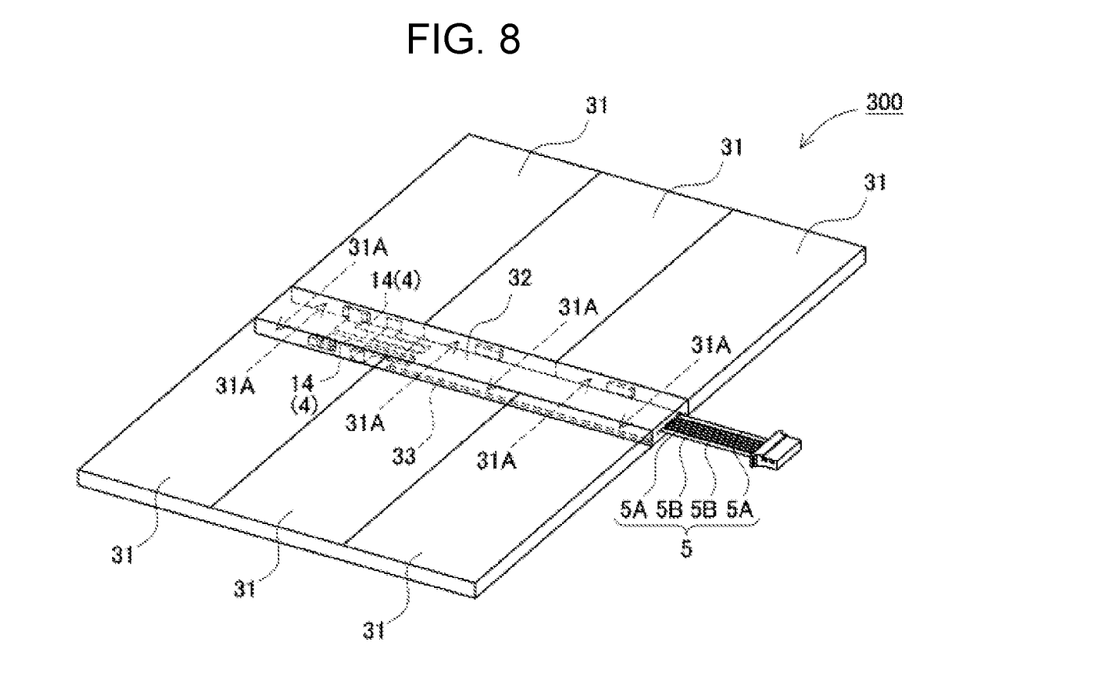
FIG. 8 is a perspective view of a battery pack in accordance with yet another example of the present invention.

The present exemplary embodiment has described battery pack 100 in which two thin cells 1 are disposed on the opposite sides of circuit board 3 as shown in FIG. 1, or battery pack 200 in which a plurality of thin cells 21 are arranged side by side in the longitudinal direction along one side of circuit board 23 as shown in FIG. 3. However, as shown in FIG. 8, battery pack 300 in which thin cells 31 are disposed on both sides of circuit board 33, and are arranged side by side in the longitudinal direction along both sides of circuit board 33 may be employed. In this case, the lengths of the circuit board and battery pack in the arrangement direction of thin cells 31 can be made shorter than those in the case that thin cells 21 are arranged on one side of circuit board 23 as shown in FIG. 3.

In the battery pack of the present exemplary embodiment, all of thin cells 21 are arranged at the positions where terminal surfaces 21A face circuit board 23 as shown in FIG. 3. However, the following structure as shown in FIG. 8 may be employed:

at least one of thin cells 31 (four thin cells on the right side in FIG. 8) is arranged at the position where terminal surface 31A faces circuit board 33; and the other thin cells 31 (two thin cells on the left side in FIG. 8) are arranged at the positions where terminal surfaces 31A do not face circuit board 33 but face anchor portions 4 as lead plates 14 connected to circuit board 33.

Figure 9:
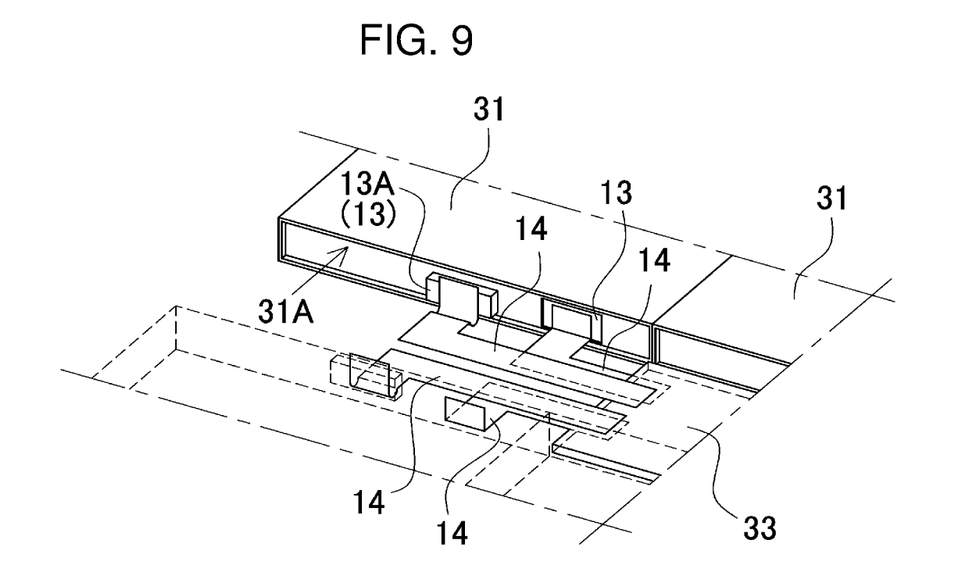
FIG. 9 is an enlarged perspective view showing a structure in which thin cells of the battery pack of FIG. 8 are connected to a circuit board.

In this case, extended lead plates 14 are buried as the center of the frame in resin mold portion 32, and terminal surfaces 31A of thin cells 31 are strongly connected to them without coming off. Here, lead plates 14 connected to positive and negative electrode terminals 13 of thin cell 31 whose terminal surface 31A does not face circuit board 33 are arranged along the opposite surfaces of circuit board 33 and connected to circuit board 33 as shown in FIG. 9. Therefore, lead plates 14 can be disposed separately from each other, and can be buried in resin mold portion 32 while the contact between them is certainly prevented.

In the battery pack of the present exemplary embodiment, as shown in FIG. 4, resin mold portion 2 is formed in two processes: forming first resin mold portion 2A; and forming second resin mold portion 2B. However, resin mold portion 2 may be formed in one process. In this case, the rated temperature (about 140° C.) of a temperature fuse as one of safety components 16 is lower than the temperature (about 240° C.) of the molten resin. Therefore, by increasing the flow distance of the molten resin from the injection port of the molten resin to the temperature fuse, the temperature of the molten resin arriving at the temperature fuse is set at 140° C. or less.

Figure 10:
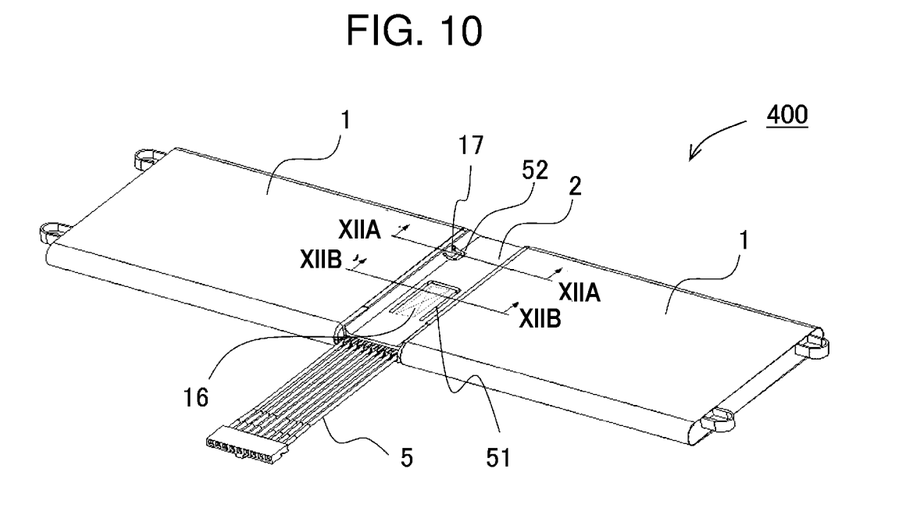
FIG. 10 is a perspective view of a battery pack in accordance with still another example of the present invention.
Figure 11:
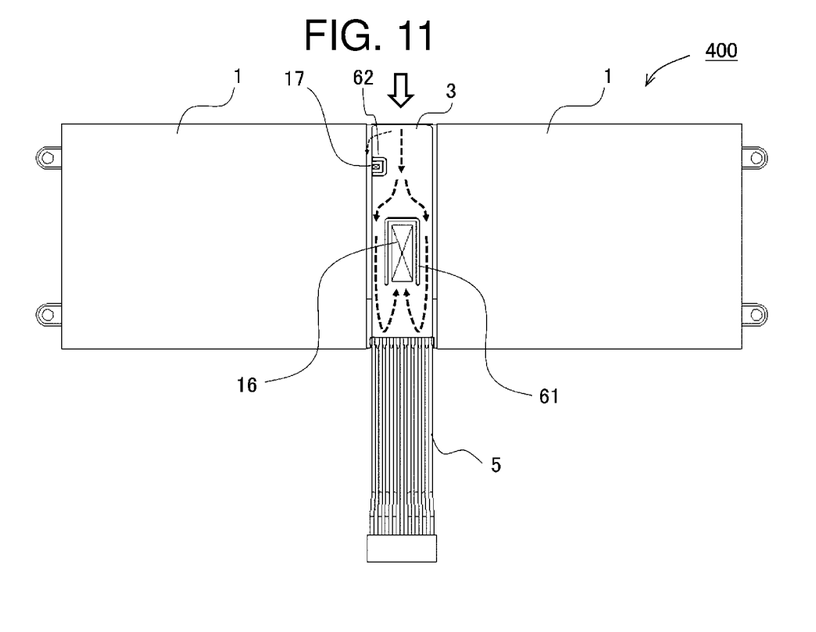
FIG. 11 is a diagram showing the flow of molten resin of the battery pack in accordance with still another example of the present invention.

Specifically, as shown in FIG. 11, the periphery of the temperature fuse and FET as safety component 16 is surrounded with die 61 having a channel shape. The channel shape is open toward the opposite direction to the surface facing the injection port (white arrow) of the molten resin. The molten resin injected from the injection port is pushed back by the surface facing the injection port as shown by the dotted arrows, then flows into channel-shaped die 61, becomes cold to 140° C. or less, and then comes into contact with the temperature fuse and FET as safety component 16. Therefore, in battery pack 400 of FIG. 10, resin mold portion 2 includes channel-shaped resin groove 51 surrounding the periphery of the temperature fuse and FET. In battery pack 400, temperature sensor 17 is disposed close to thin cell 1 on circuit board 3, and molten resin is injected around temperature sensor 17 surrounded by channel-shaped die 62.

Figure 12A:
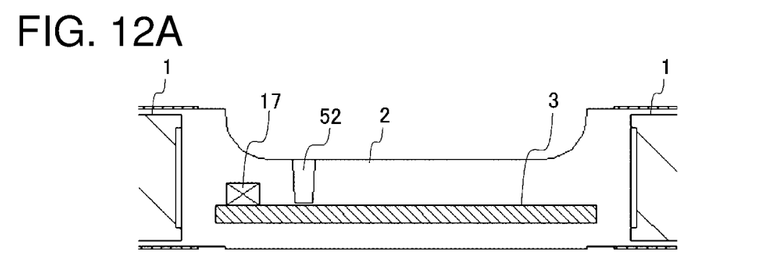
FIG. 12A is a sectional view taken along line XIIA-XIIA on the battery pack of FIG. 10.
Figure 12B:
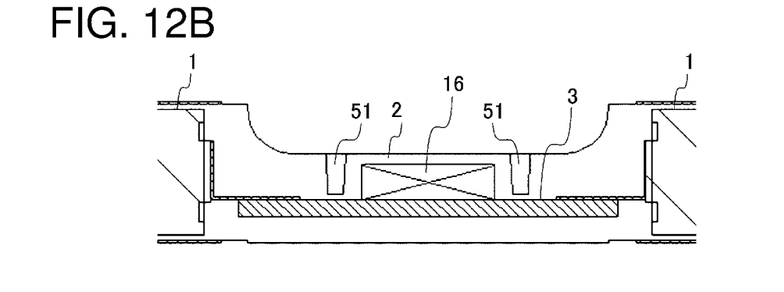
FIG. 12B is a sectional view taken along line XIIB-XIIB on the battery pack of FIG. 10.

FIG. 12A is a sectional view taken along line XIIA-XIIA on battery pack 400 of FIG. 10, and FIG. 12B is a sectional view taken along line XIIB-XIIB. As shown in FIG. 12A, resin mold portion 2 is formed between temperature sensor 17 and thin cell 1, and channel-shaped resin groove 52 is formed in the other periphery of temperature sensor 17. Therefore, temperature sensor 17 senses heat generation of thin cell 1 via resin mold portion 2, and resin groove 52 can prevent heat radiation. As shown in FIG. 12B, resin groove 51 is formed between the temperature fuse and FET as safety component 16, and temperature sensor 17 and thin cells 1. Therefore, even if safety component 16, especially the FET, generates heat, the heat generation hardly affects temperature sensor 17, thin cells 1, and an electronic component that is disposed in circuit board 3 and is separated from the FET via resin groove 52. In other words, thanks to channel-shaped resin grooves 51 and 52, temperature sensor 17 can measure the temperature of thin cell 1 at a higher accuracy. Resin grooves 51 and 52 surround three ways of safety component 16 and temperature sensor 17, and may have any shape having a partially opening periphery, such as a channel shape, U shape, or C shape.

Figure 13:
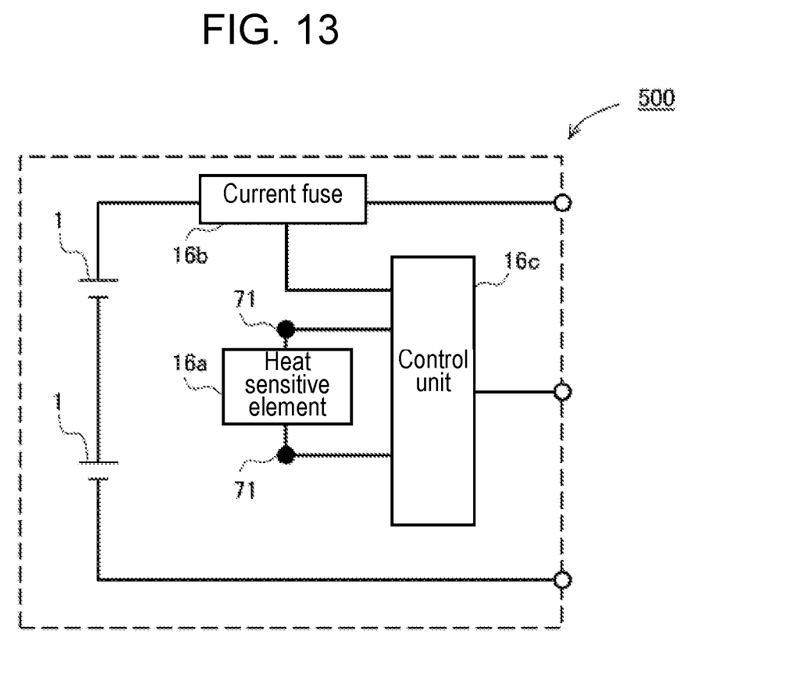
FIG. 13 is a circuit diagram of the battery pack in accordance with still another example of the present invention.

In the battery pack of the present exemplary embodiment, as shown in FIG. 4, resin mold portion 2 is formed in two processes: forming first resin mold portion 2A; and forming second resin mold portion 2B. However, resin mold portion 2 may be formed in one process. In this case, as shown in FIG. 13, safety component 16 on circuit board 3 includes: heat sensitive element 16a for measuring the temperature of battery pack 500; current fuse 16b for blocking the current from thin cells 1; control unit 16c for blowing current fuse 16b when heat sensitive element 16a has measured an abnormal temperature; and connection points 71 that are disposed on the wire for connecting control unit 16c to heat sensitive element 16a and at which heat sensitive element 16a is short-circuited. Die 81 for short-circuiting connection points 71 is used during injection of the molten resin. In this case, even if heat sensitive element 16a measures an abnormal temperature (for example, 130° C. or more), control unit 16c determines a normal temperature because heat sensitive element 16a is short-circuited, and current fuse 16b is prevented from blowing. After the molten resin becomes cold to a temperature lower than the abnormal temperature, die 81 is removed from battery pack 500. After die 81 is removed, connection points 71 are covered with a pasted tape or label or an injected adhesive or resin so that connection points 71 are not exposed. Thus, resin mold portion 2 can be formed in one process.

In a battery pack of the present invention, a plurality of thin cells can be disposed on the same plane and strongly interconnected without warpage. Therefore, the battery pack can be suitably applied to a portable device such as a smartphone or a tablet that requires a thin battery pack of a high voltage and a large battery capacity.

The invention claimed is:

1. A battery pack comprising:
   a plurality of planar cells each including a terminal surface;
   a circuit board electrically coupled to the plurality of planar cells; and
   a resin mold portion in which the circuit board is buried, wherein the plurality of planar cells are disposed at a position where at least one terminal surface of the plurality of planar cells faces the circuit board,
   wherein the terminal surfaces of the plurality of planar cells and the circuit board are buried in the resin mold portion, the plurality of planar cells are disposed on the same plane, and the circuit board is integrally coupled and fixed to the plurality of planar cells so as to be parallel with opposite surfaces of each of the plurality of planar cells,
   wherein the battery pack further comprises:
      a plurality of lead lines each having a first end coupled to the circuit board and a second end drawn to an outside from the resin mold portion; and
      a lead line holder for holding the plurality of lead lines at fixed positions,
   wherein the lead line holder is fixed to the resin mold portion by insert molding in a state where a lead surface of the lead line holder is exposed on a surface of the resin mold portion, the plurality of lead lines being drawn to the outside through the lead surface of the lead line holder,
   wherein the lead line holder is connected and fixed to a fixed position of the circuit board, and the lead line holder is vertically divided into two parts including a first holder and a second holder,
   wherein the first holder includes first grooves on a surface of the first holder facing the second holder, each of the first grooves including a first core wire hole and a first guide hole,
   wherein the second holder includes second grooves on a surface of the second holder facing the first holder, each of the second grooves including a second core wire hole and a second guide hole,
   wherein the surface of the first holder facing the second holder is connected to the surface of the second holder facing the first holder such that the first grooves of the first holder and the second grooves of the second holder form holes extending along an extending direction of the plurality of lead lines, each of the holes having (i) a first groove part formed by the first core wire hole of the first grooves and the corresponding second core wire hole of the second grooves and (ii) a second groove part formed by the first guide hole of the first grooves and the corresponding second guide hole of the second grooves, the first groove part having a smaller inner diameter than the second groove part, and
   wherein the plurality of lead lines are held by the lead line holder so as to be separately and individually disposed in the holes.

2. The battery pack according to claim 1, wherein each of the plurality of planar cells includes an anchor portion on the terminal surface, the anchor portion being buried in the resin mold portion.

3. The battery pack according to claim 2, wherein the anchor portion includes a lead plate fixed to an electrode terminal of each of the plurality of planar cells.

4. The battery pack according to claim 1, wherein a pair of wrap portions extending to opposite surfaces of each of the plurality of planar cells are integrally formed on the resin mold portion, each of the plurality of planar cells is disposed between the pair of wrap portions, and each of the plurality of planar cells is fixed to the resin mold portion by insert molding.

5. The battery pack according to claim 4, wherein
a thickness of each of the wrap portions is set at 0.1 mm or more and 0.5 mm or less, and a width of each of the wrap portions is set at 1 mm or more and 5 mm or less.

6. The battery pack according to claim 1, wherein
opposite surfaces of the resin mold portion and the opposite surfaces of each of the plurality of planar cells are disposed on the same planes.

7. The battery pack according to claim 1, wherein
the plurality of planar cells are disposed on opposite sides of the circuit board,
the circuit board disposed between the plurality of planar cells is buried in the resin mold portion, and
the resin mold portion in which the circuit board is buried fixes the plurality of planar cells to the opposite sides of the circuit board, the plurality of planar cells being disposed on the same plane.

8. The battery pack according to claim 1, wherein
the plurality of planar cells are disposed on one side of the circuit board and arranged side by side in a longitudinal direction of the circuit board, and
the resin mold portion in which the circuit board is buried fixes the plurality of planar cells to the one side of the circuit board.

9. The battery pack according to claim 1, wherein
a safety component or a temperature sensor disposed between adjacent planar cells, of the plurality of planar cells, is fixed to the circuit board, and
the safety component or the temperature sensor is buried in the resin mold portion, and temperatures of the plurality of planar cells are detected solely by the safety component or the temperature sensor.

* * * * *